(12) United States Patent
Speelman et al.

(10) Patent No.: US 11,964,427 B2
(45) Date of Patent: Apr. 23, 2024

(54) LIQUEFIER TUBE FOR AN ADDITIVE MANUFACTURING SYSTEM

(71) Applicant: BOND HIGH PERFORMANCE 3D TECHNOLOGY B.V., Enschede (NL)

(72) Inventors: Marald Speelman, Enschede (NL); Klaas Groen, Enschede (NL); Antonie Everhard Ekkelenkamp, Enschede (NL); Adrianus Bruggeman, Enschede (NL); Martijn Johannes Wolbers, Enschede (NL); Koendert Hendrik Kuit, Enschede (NL)

(73) Assignee: BOND HIGH PERFORMANCE 3D TECHNOLOGY B.V., Enschede (NL)

( * ) Notice: Subject to any disclaimer, the term of this patent is extended or adjusted under 35 U.S.C. 154(b) by 472 days.

(21) Appl. No.: 17/281,439

(22) PCT Filed: Oct. 2, 2019

(86) PCT No.: PCT/EP2019/076759
§ 371 (c)(1),
(2) Date: Mar. 30, 2021

(87) PCT Pub. No.: WO2020/070219
PCT Pub. Date: Apr. 9, 2020

(65) Prior Publication Data
US 2021/0394442 A1 Dec. 23, 2021

(30) Foreign Application Priority Data

Oct. 3, 2018 (EP) ...................................... 18198461
Oct. 3, 2018 (EP) ...................................... 18198464

(51) Int. Cl.
*B29C 64/209* (2017.01)
*B29C 48/02* (2019.01)
(Continued)

(52) U.S. Cl.
CPC ............ *B29C 64/209* (2017.08); *B29C 48/02* (2019.02); *B29C 48/05* (2019.02);
(Continued)

(58) Field of Classification Search
CPC ....... B29C 64/209; B29C 48/02; B29C 48/05; B29C 48/3001; B29C 48/92; B29C 48/25; B33Y 30/00; C25D 1/02
See application file for complete search history.

(56) References Cited

U.S. PATENT DOCUMENTS 7,588,789 B1 * 9/2009 Kearns ................ B29C 48/0022
426/523
7,611,347 B1 * 11/2009 Kearns .................. B29C 48/688
425/464
(Continued)

FOREIGN PATENT DOCUMENTS

EP 0193678 A1 9/1986
EP 0467680 A1 1/1992
(Continued)

*Primary Examiner* — Nahida Sultana
(74) *Attorney, Agent, or Firm* — Hudak, Shunk & Farine Co. LPA (57) ABSTRACT

A liquefier tube for an additive manufacturing system, including a body provided with a feed channel including a feeding portion having a first diameter, an outlet portion having a second diameter, the first diameter being larger than the second diameter, and a transitional portion interconnecting the feeding portion and the outlet portion. The transitional portion has a decreasing third diameter from the first diameter to the second diameter, and an inner surface of the transitional portion is provided with a plurality of ribs. Methods of manufacturing the liquefier tube.

21 Claims, 3 Drawing Sheets

(51) Int. Cl.
  *B29C 48/05* (2019.01)
  *B29C 48/30* (2019.01)
  *B29C 48/92* (2019.01)
  *B33Y 30/00* (2015.01)
  *C25D 1/02* (2006.01)

(52) U.S. Cl.
  CPC .......... *B29C 48/3001* (2019.02); *B29C 48/92* (2019.02); *B33Y 30/00* (2014.12); *C25D 1/02* (2013.01)

(56) References Cited

U.S. PATENT DOCUMENTS

| | | | |
|---|---|---|---|
| 8,236,227 B2* | 8/2012 | Batchelder | D01D 5/42 264/308 |
| 11,267,199 B2* | 3/2022 | Smith | B29C 64/227 |
| 2016/0046073 A1 | 2/2016 | Hadas | |
| 2018/0200955 A1 | 7/2018 | Hoelldorfer et al. | |
| 2018/0243962 A1 | 8/2018 | Luttmann et al. | |
| 2018/0345573 A1* | 12/2018 | Zinniel | B21C 33/02 |

FOREIGN PATENT DOCUMENTS

| | | | |
|---|---|---|---|
| FR | 3063451 A1 | 9/2018 | |
| KR | 101781601 B1 | 9/2017 | |
| WO | 2017082934 A1 | 5/2017 | |

* cited by examiner

LIQUEFIER TUBE FOR AN ADDITIVE MANUFACTURING SYSTEM

FIELD OF THE INVENTION

The invention relates to a liquefier tube for an additive manufacturing (AM) system. The invention further relates to methods of manufacturing the liquefier tube.

BACKGROUND OF THE INVENTION

Liquefier tubes in AM systems are used to melt AM feedstock material to allow the feedstock material to be deposited in layers to manufacture three-dimensional (3D) objects to be created in accordance to electronic models which are used in the AM systems. AM feedstock material can comprise polymers which can be advantageously used in AM systems for 3D modeling objects.

Liquefier tubes can be attached to a three-dimensionally movable platform, also known in the art as printhead assembly, which may be further equipped with a supply of AM feedstock material and heaters to heat the liquefier tube to obtain a temperature appropriate for dispensing the AM material for depositing on the 3D object. The printhead assembly can be moved relative to the object in space to be created using a gantry. Drives and a controller allow the gantry to move the printhead assembly and the AM feedstock material supply to deposit the AM feedstock material and create the 3D object.

The liquefier tube has a liquefier body provided with a feed channel, wherein the feed channel has a feeding portion, an outlet portion and a transitional portion interconnecting the feeding portion and the outlet portion. The feeding portion interfaces with the AM feedstock supply. The outlet portion, in the art also referred to as nozzle, has an orifice from which the molten AM feedstock material is dispensed. In the art, the entire liquefier tube may sometimes also be referred to as nozzle.

The feeding portion and outlet portion usually have different diameters. The transitional portion interfaces the outlet portion to the feeding portion. The liquefier tube is usually arranged near heating elements which can heat up the liquefier tube to allow the AM feedstock material in the feed channel to melt. The melting can be performed at high temperature in the transitional portion to have a minimal amount of molten AM feedstock material. Dimensions of the transitional portion can be chosen to minimize residence time of the AM feedstock material to prevent degradation or even decomposition of the material.

In the art, liquefier tubes may have a feed channel within the liquefier body, having a circular-shaped inner cross-section, and a narrowing transitional portion between a feeding portion and an outlet portion, which are easy to manufacture by machining the metal liquefier body and which are designed to reduce residence time of the AM feedstock material to prevent clogging and charring. This however may cause insufficient heat exchange between the liquefier tube inner surface and the AM feedstock material.

SUMMARY OF THE INVENTION

It is therefore an object of the invention to overcome said problems and disadvantages. The object is achieved according to the invention in a liquefier tube for an additive manufacturing (AM) system.

The liquefier tube according to an embodiment of the invention, comprises a body provided with a feed channel, said feed channel having a feeding portion having a first diameter, an outlet portion having a second diameter, wherein the first diameter is larger than the second diameter, and a transitional portion interconnecting the feeding portion and the outlet portion.

Said transitional portion has a decreasing third diameter from said first diameter to said second diameter, and an inner surface of said transitional portion is provided with a plurality of ribs.

The transitional portion is the portion wherein molten AM feedstock material is held prior to depositing on the object to be created. The ribs within the transitional portion allow enhanced heat exchange between the inner surface of the feed channel and the AM feedstock material. The enhancement causes faster heating of the AM feedstock material, thereby an amount or volume of AM feedstock material in the transitional portion can be reduced, while maintaining an AM feedstock material flow as required by 3D modeling processes in which the AM system is utilized.

In an embodiment, said plurality of ribs are arranged one of longitudinally and spirally within said transitional portion.

Longitudinal orientation of the ribs allows faster flow of AM feedstock material to the outlet portion. Spirally oriented ribs allow more intensive heat exchange between the feed channel surface at the transitional portion and the AM feedstock material.

In an embodiment, the ribs of said plurality of ribs are spaced evenly along a circumference of said inner surface of said transitional portion.

This provides a balanced AM feedstock material flow through a cross section of the transitional portion having ribs.

In an embodiment, the ribs of said plurality of ribs have a differentiable cross-sectional profile.

This prevents formation of dead spots at the grooves between the ribs, and thereby prevents clotting and charring.

In an embodiment, the ribs of said plurality of ribs have a differentiable profile as a function of a longitudinal position within the transitional portion of the feed channel.

In an embodiment, transitional portion is provided with at least one distribution element that is supported by ribs of said plurality of ribs at a supporting location.

In use the distribution element thus placed in the main flow of the molten AM feedstock material distributes the AM feedstock material to the grooves between the ribs, thereby significantly increasing heat exchange between the AM feedstock material and the transitional portion surface. The distribution element also causes the AM feedstock material to flow around the distribution element in the AM feedstock material feed direction, thereby improving the heat distribution within the liquefier tube. Thus, melting of the AM feedstock material can be performed more efficiently. The melting can be performed in a smaller volume of the transitional portion, thereby reducing AM feedstock material residence time at melting temperature.

In an embodiment, said at least one distribution element has a diameter that is larger than a maximum radial distance between ribs of said plurality of ribs at said supporting location.

This allows support of the at least on distribution element by the ribs themselves without requiring a support element.

In an embodiment, said at least one distribution element comprises a heat conductive material.

This way the distribution element not only distributes the molten feedstock material, but also distributes the heat within the transitional portion. Thereby the melting of the AM feedstock material is performed significantly more efficient and uniformly.

In an embodiment, the liquefier tube further comprises a thermal barrier within said body between said feeding portion and said transitional portion.

In an embodiment, at least one of said feeding portion and said outlet portion has a circular cross section.

The object is further achieved in a method of manufacturing a liquefier tube according to the invention. The method comprises a. providing a mandrel having an outer surface that is provided with an outer profile that is complementary to an inner profile of said feed channel of said liquefier tube as described above, wherein a plurality of grooves in the mandrel correspond to said plurality of ribs in the feed channel of said liquefier tube, and wherein said outer surface is electrically conductive;

b. depositing a metal layer on said electrically conductive cover layer for forming said liquefier tube using electroforming;

c. removing said liquefier tube from the mandrel.

Electroforming advantageously allows accurate manufacturing of the liquefier tube, as described above, wherein the feed channel has a decreasing third diameter from said feeding portion to said outlet portion, and wherein the feed channel can be manufactured having a plurality of ribs which correspond to the grooves in the mandrel.

Moreover, the inner surface of the feed channel resulting from the method can be as smooth as the outer surface of the mandrel. No post-processing such as machining or polishing is required for the feed channel inner surface.

The object is further achieved in an alternative method of manufacturing a liquefier tube according to the invention. The method comprises a. providing a machining tool having an outer surface profile complementary to an inner surface profile of said feed channel of said liquefier tube, wherein a plurality of grooves in the mandrel correspond to said plurality of ribs in the feed channel of said liquefier tube, and wherein said outer surface is electrically conductive;

b. providing a metal body for accommodating said feed channel of said liquefier tube;

c. performing at least one of electrochemically machining (ECM) and electrically discharge machining (EDM) on said metal body to form said feed channel within said metal body using said machining tool.

ECM and EDM advantageously allow accurate manufacturing of the liquefier tube, as described above, wherein the transitional portion of the feed channel has a decreasing third diameter from said feeding portion to said outlet portion.

BRIEF DESCRIPTION OF THE DRAWINGS

Further features and advantages of the invention will become apparent from the description of the invention by way of exemplary and non-limiting embodiments of a liquefier tube according to the invention.

The person skilled in the art will appreciate that the described embodiments of the liquefier tube are exemplary in nature only and not to be construed as limiting the scope of protection in any way. The person skilled in the art will realize that alternatives and equivalent embodiments of the liquefier tube can be conceived and reduced to practice without departing from the scope of protection of the present invention.

Reference will be made to the figures on the accompanying drawing sheets. The figures are schematic in nature and therefore not necessarily drawn to scale. Furthermore, equal reference numerals denote equal or similar parts. On the attached drawing sheets.

DETAILED DESCRIPTION OF EMBODIMENTS

Embodiments of the invention will be elucidated in the description below with reference to the drawings.

Figure 1A:
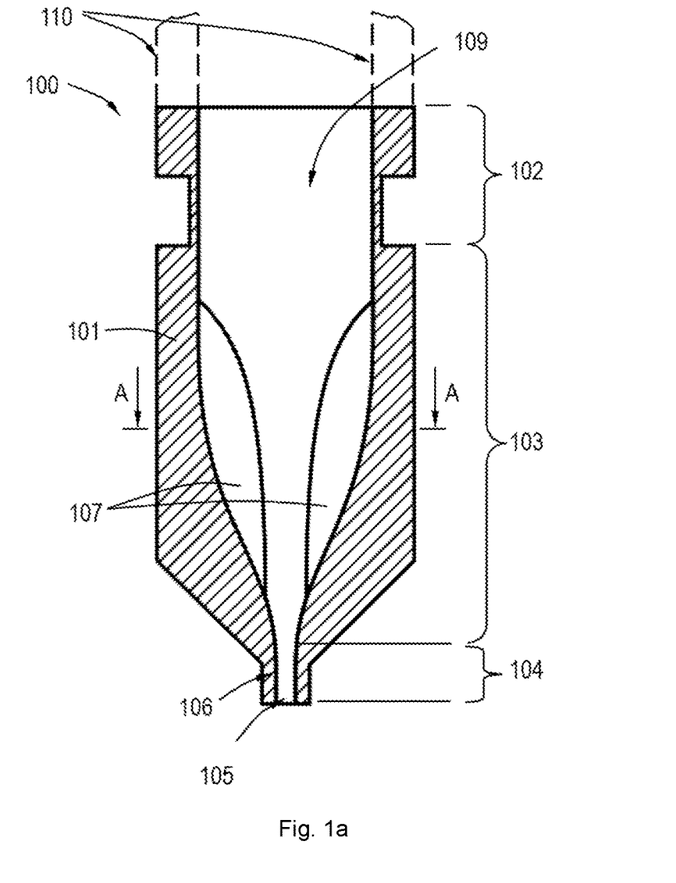
FIG. 1a shows a longitudinal cross section view of a liquefier tube according to an embodiment of the invention.

In FIG. 1a a liquefier tube 100 is shown having a liquefier body 101, wherein a feed channel 109 is created for feeding initially solid AM feedstock material, and molten AM feedstock material towards an orifice 105. The feed channel 109 can be formed as a tubular passage through the liquefier body 101. The liquefier body 101 is preferably manufactured from a heat conductive material, such as a metal, and can be mounted in a heating system to melt the supplied solid AM feedstock material into molten AM feedstock material. The molten AM feedstock material can exit through orifice 105 of the feed channel 109. The liquefier tube 100 is preferably manufactured in one piece.

By three-dimensionally moving the liquefier tube 100 and simultaneously supplying the solid AM feedstock material to the orifice 105, molten AM feedstock material can be deposited in tracks onto an object to be printed using 3D printing methods. In such methods the tracks form layers which ultimately constitute the object. After the deposition of the tracks, the AM feedstock deposited from the orifice 105 fuses with the previously deposited tracks and layers of the object to be printed and solidifies.

The feed channel 109 has a feeding portion 102, a transitional portion 103, connected to the feeding portion 103, and an outlet portion 104 connected to the transitional portion. The feeding portion 102 may be extended or be connected to an extension 110 such as an AM feedstock supply or tube via an optional rim or may be integrated with the AM feedstock supply. The feeding portion 102 may have any length from zero to a length suitable for interfacing with a preheating zone of the heating system (neither shown nor further explained in this application).

The transitional portion 103 connects to the feeding portion 102 with a transition 107 between the respective portions 102, 103. The feeding portion 102 may be provided with a thermal barrier 108, to allow the feeding portion 102 and the transitional portion 103 to have different temperatures. The feeding portion 102 close to the thermal barrier 108 may for example have a glass temperature of the AM feedstock material, whereas the transitional portion 103 has a temperature equal to or above a melting temperature of the AM feedstock material.

The thermal barrier 108 may be constituted by a circumferential groove in the liquefier body 101 as shown in FIG. 1a, or by an intermediate section of a thermally low conductive material or insulating material. The thermal barrier 108 can be located at or near the transition between the feeding portion and the transitional portion of the feed channel 109.

The outlet portion 104 ultimately leads the feed channel 109 to the orifice 105. The outlet portion 104 starts from transition 106 in the feed channel 109.

The outlet portion 104 may have a constant diameter. The connection 106 between transitional portion 103 and outlet portion can be smooth, with a differentiable diameter as a function of a longitudinal position within the feed channel.

The outlet portion 104 may be cylindrically shaped having a circular cross section.

In FIG. 1a the liquefier tube 100 is shown with a corrugated inner surface having ribs 107 disposed within the feed channel 109. Preferably the ribs 107 are accommodated within the transitional portion 103, wherein in use the melting of the AM feedstock material is performed. The ribs 107 can be made from the same heat conductive material as the liquefier tube body 101, and engage the AM feedstock material from aside when pushed through the feed channel 109. The ribs 107 increase the inner surface of the transitional portion 103 and thereby improve heat transfer between the liquefier tube 100 and the AM feedstock material. The ribs 107 may have various profiles in longitudinal direction. Preferably the ribs 107 are made one with the transitional portion 103. In FIG. 1a the beginning and end of the ribs 107 have an angle relative to the transitional portion inner surface. It may be envisaged by the skilled person to apply smoothed angles to avoid dead spots.

The ribs 107 may be at least partially spirally arranged within a section of the transitional portion 103, or the ribs 107 may be longitudinally arranged in another section of the transitional portion 103. In FIG. 1a the distribution elements are shown longitudinally arranged.

Figure 1B:
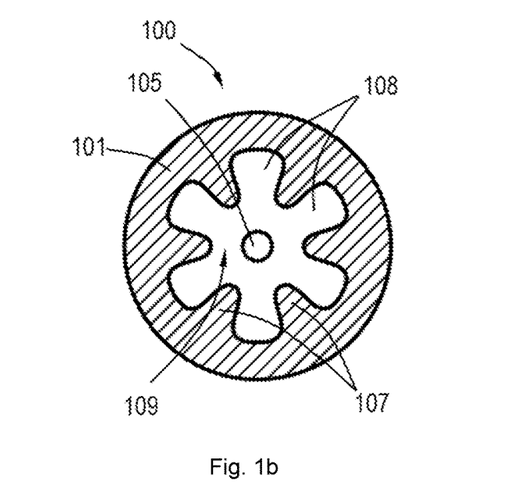
FIG. 1b shows a cross section view of the liquefier tube along the line A-A' according to FIG. 1a, FIG. 2 shows a longitudinal cross section view of a liquefier tube.

In FIG. 1b a cross section view is shown of the liquefier tube at line A-A of FIG. 1a. In the center, orifice 105 is visible. The ribs 107 can be arranged evenly spaced circumferentially across a cross section of the transitional portion 103.

In use, molten AM feedstock material can be pressed into the grooves 108 separating the ribs 107. As shown in FIG. 1b, the ribs 107 may have a smooth corrugated differentiable profile across its cross section, to avoid formation of dead spots.

Figure 2:
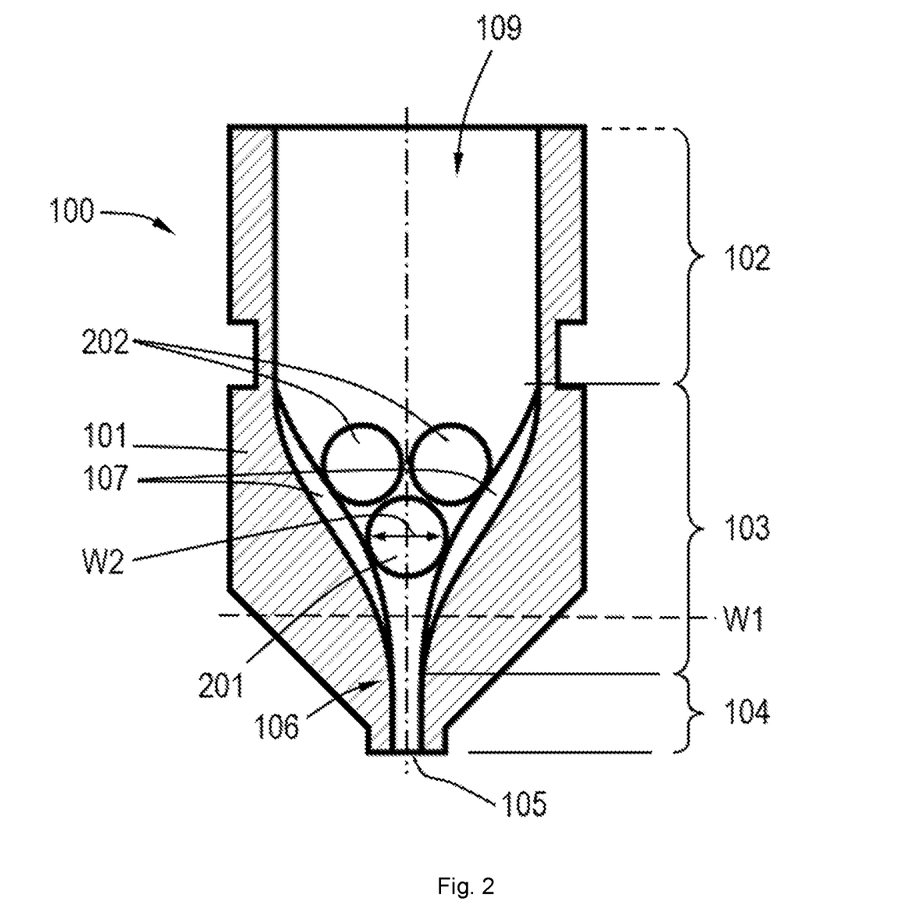

The liquefier tube 100 of FIG. 2 is provided with distribution elements 201 and 202 arranged between the ribs 107. The distribution element 201 is lowest in longitudinal direction in FIG. 2. The distribution element 201 can have a diameter W2 which is larger than a maximal distance W1 between the ribs in a direction perpendicular to a central axis represented by the dot dashed line in FIG. 2 to prevent the distribution element 201 from obstructing the passage to the outlet portion 104 of the feed channel 109. The distribution element 201 causes the molten AM feedstock material within the transitional portion 103 to be guided further to the sides, within the grooves 108 of the transitional portion 103, thereby further enhancing heat transfer between the liquefier body 101 and the AM feedstock material. The distribution elements are preferable manufactured from a heat conductive material such as a metal.

Additional distribution elements 202 can be stacked on top of the distribution element 201 to further enhance the distribution of AM feedstock material in a lateral direction within the transitional portion 103, thereby further improving the heat transfer.

In the example of FIG. 2, the distribution elements 201, 202 are represented as spherical objects. The shape of the distribution elements 201, 202 may however be different, i.e. the shape may be also for example ellipsoidal or cylindrical.

It will be clear to a person skilled in the art that the scope of the present invention is not limited to the examples discussed in the foregoing but that several amendments and modifications thereof are possible without deviating from the scope of the present invention as defined by the attached claims. While the present invention has been illustrated and described in detail in the figures and the description, such illustration and description are to be considered illustrative or exemplary only, and not restrictive.

Figure 3:
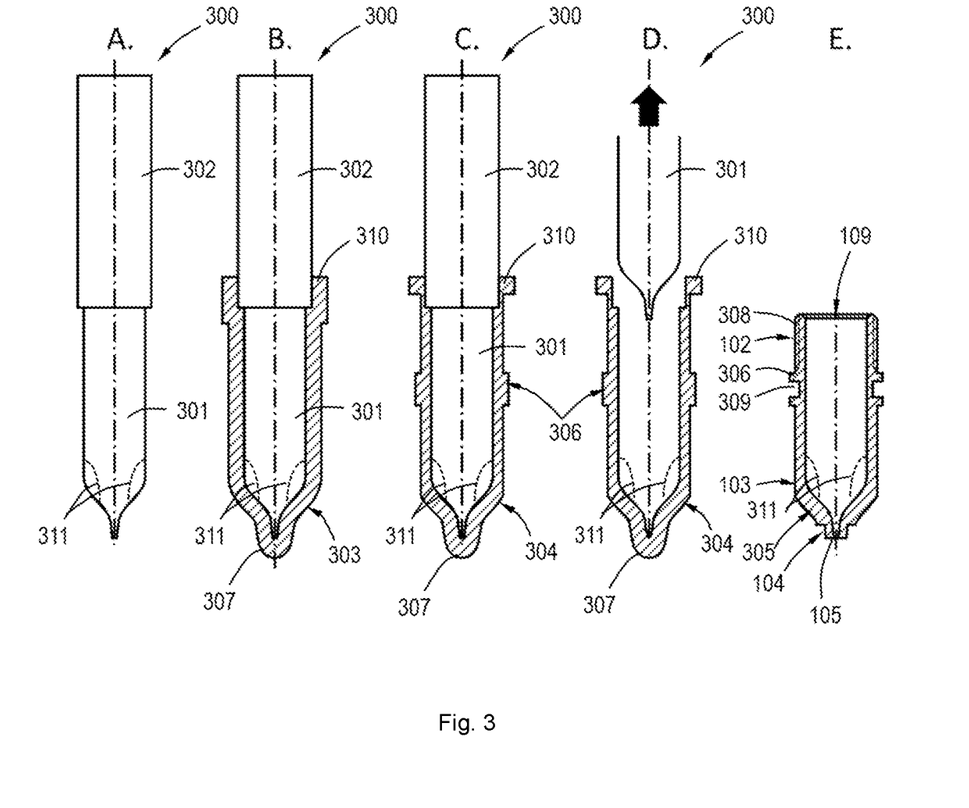
FIG. 3 shows stages A-E of a method of manufacturing a liquefier tube according to an embodiment of the invention.

In FIG. 3 stages A-E of a preferred method of manufacturing the liquefier tube are shown.

In stage A, a mandrel 300 is provided. The mandrel 300 in this example is provided with a liquefier forming section 301. The mandrel 300 is shown having a stem 302 connected to the liquefier forming section 301 for fastening the mandrel 300 to for example a support (not shown).

The liquefier forming section 301 has an outer profile which closely corresponds to the inner profile of the feed channel 109, including the feeding portion 102, transitional portion 103 and outlet portion 104 of the liquefier tube 100 as described above. The liquefier forming section 301 of the mandrel 300 has grooves 311 in which the ribs 107 of the feed channel 109 of the liquefier tube 100 can be formed.

Optionally, the outer profile of the liquefier forming section 301 can be provided with a slight draft angle to facilitate removal of the liquefier tube from the liquefier forming section 301 after manufacturing using the mandrel 300. The outer surface of the liquefier forming section 301 has a roughness Ra low enough to be suitable for the liquefier tube, i.e. feed channel inner surface, to ensure low residence time of AM feedstock material when the liquefier tube is in use. The roughness Ra may be less than 3.2 µm, preferably less than 0.4 µm more preferably less than 0.1 µm, to be able to manufacture the liquefier tube with a corresponding roughness of the inner surface of the feed channel 109.

The liquefier forming section 301 can be made from electrically conductive material such as a metal. Alternatively, the liquefier forming section 301 has an electrically conductive surface. The latter can be achieved by for example applying a graphite layer on the liquefier forming section 301, or by applying a metal to the liquefier forming section 301 surface.

In stage B, as shown in FIG. 3, a liquefier tube primitive 303 is electroformed around the liquefier forming section 301. The electroforming is performed electrochemically using electrolysis or electroplating. A metal such as nickel is electrochemically deposited on the liquefier forming section 301 outer surface. The electroforming is performed on a highly fine crystalline level to ensure smooth growth of the metal to form the liquefier tube primitive 303 and to provide a smooth inner surface of the feed channel of the liquefier tube primitive 303.

The liquefier tube primitive 303 is not yet fully functional as liquefier tube 100 as described above. It may have a tip 307 for example where an orifice for dispensing molten AM feedstock material is expected. The outer surface of the electroformed liquefier tube primitive 303 may be left rough and inaccurately formed.

In stage C, as shown in FIG. 3, optionally machining of the outer surface of the liquefier tube primitive 303 may be performed such as turning, to obtain an outer profile adapted for fitting in a heating system for example to obtain a machined liquefier tube primitive 304. Various structures such as a thickening 306 and optional rim 310 may be formed using the machining method.

In stage D, as shown in FIG. 3, the mandrel 300, i.e. the liquefier forming section 301 is retracted from the machined liquefier tube primitive 304.

In stage E, as shown in FIG. 3, the machined liquefier tube primitive 304 may be further machined into a finished liquefier tube 305 to form other structures such as for example a circumferential groove 309, corresponding to the thermal barrier 108 in FIG. 1, or a screw thread 308 around the liquefier tube outer surface corresponding to feeding portion 102 for mounting the finished liquefier tube 305 into a printhead of an AM apparatus. The tip 307 may be removed for example by grinding to expose the orifice 105. The outer portion of the finished liquefier tube 305 corresponding to the outlet portion may be machined to form for example surfaces having a wrench size for easy mounting in an AM printhead.

As an alternative to electroforming the liquefier tube using the mandrel, the liquefier tube may also be manufactured using machining techniques such as electrochemically machining (ECM) and electrically discharge machining (EDM). In these techniques a machining tool is used to remove metal from the inside of a liquefier body to form the feed channel. A proper machining tool is used having an outer profile corresponding to the profile of the inner surface of the feed channel of the liquefier tube, and ribs for forming the grooves 108 of the liquefier tube feed channel 109. The ribs 107 within the liquefier tube feed channel 109 are subsequently formed in between the grooves 108. The machining tool can be made from a conductive material such as a metal or a non-conductive material having a metal outer layer to ensure that the outer surface of the machining tool is electrically conductive.

In electrochemical machining, the metal of the liquefier tube body is removed using electrolysis. The machining tool is brought into proximity of the liquefier tube body and progressively liquefier tube material is electrochemically removed, until the shape of the thus formed feed channel corresponds to the shape of the machining tool.

The present invention is not limited to the disclosed embodiments. Variations to the disclosed embodiments can be understood and effected by a person skilled in the art in practicing the claimed invention, from a study of the figures, the description and the attached claims. Wherever cross sections are not limited to round shapes, the term 'diameter' can be interpreted as 'average diameter'. In the claims, the word "comprising" does not exclude other steps or elements, and the indefinite article "a" or "an" does not exclude a plurality. The mere fact that certain measures are recited in mutually different dependent claims does not indicate that a combination of these measures cannot be used to advantage. Any reference numerals in the claims should not be construed as limiting the scope of the present invention.

| REFERENCE NUMERALS | |
|---|---|
| 100 | Liquefier tube |
| 101 | Liquefier body |
| 102 | Feeding portion |
| 103 | Transitional portion |
| 104 | Outlet portion |
| 105 | Orifice |
| 106 | Transition |
| 107 | Rib |
| 108 | Groove |
| 109 | Feed channel |

| REFERENCE NUMERALS | |
|---|---|
| 110 | Extension |
| 201, 202 | Distribution element |
| 300 | Mandrel |
| 301 | Liquefier forming section |
| 302 | Stem |
| 303 | Liquefier tube primitive |
| 304 | Machined liquefier tube primitive |
| 305 | Finished liquefier tube |
| 306 | Thickening |
| 307 | Tip |
| 308 | Screw thread |
| 309 | Groove |
| 310 | Rim |
| 311 | Groove |

The invention claimed is:

1. A liquefier tube for an additive manufacturing (AM) system, comprising:
   a body provided with a feed channel;
   said feed channel having:
      a feeding portion having a first diameter;
      an outlet portion having a second diameter, wherein the first diameter is larger than the second diameter;
      a transitional portion interconnecting the feeding portion and the outlet portion;
   wherein said transitional portion has a decreasing third diameter from said first diameter to said second diameter;
   wherein an inner surface of said transitional portion is provided with a plurality of ribs; and
   wherein the ribs of said plurality of ribs are arranged at least partially longitudinally in a first section of said transitional portion.

2. The liquefier tube according to claim 1, wherein the ribs of said plurality of ribs are arranged at least partially spirally oriented in a second section of said transitional portion.

3. The liquefier tube according to claim 1, wherein the ribs of said plurality of ribs are spaced evenly along a circumference of said inner surface of said transitional portion.

4. The liquefier tube according to claim 1, wherein the ribs of said plurality of ribs have a differentiable cross-sectional profile.

5. The liquefier tube according to claim 1, wherein the ribs of said plurality of ribs have a differentiable profile as a function of a longitudinal position within the transitional portion of the feed channel.

6. The liquefier tube according to claim 1, wherein said transitional portion is provided with at least one distribution element that is supported at a supporting location.

7. The liquefier tube according to claim 6, wherein said at least one distribution element has a diameter that is larger than a maximum radial distance between ribs of said plurality of ribs at said supporting location.

8. The liquefier tube according to claim 6, wherein said at least one distribution element comprises a heat conductive material.

9. The liquefier tube according to claim 1, further comprising a thermal barrier within said body between said feeding portion and said transitional portion.

10. The liquefier tube according to claim 1, wherein at least one of said feeding portion and said outlet portion has a circular cross section.

11. A method of manufacturing a liquefier tube according to claim 1, comprising:

a. providing a mandrel having an outer surface that is provided with an outer profile that is complementary to an inner profile of said feed channel of said liquefier tube and wherein said outer surface is electrically conductive;
b. depositing a metal layer on said electrically conducting outer surface for forming said liquefier tube using electroforming;
c. removing said liquefier tube from the mandrel.

12. A method of manufacturing a liquefier tube according to claim 1, comprising:
a. providing a machining tool having an outer surface profile complementary to an inner surface profile of said feed channel of said liquefier tube, and wherein said outer surface is electrically conductive;
b. providing a metal body for accommodating said feed channel of said liquefier tube;
c. performing at least one of electrochemically machining (ECM) and electrically discharge machining (EDM) on said metal body to form said feed channel within said metal body using said machining tool.

13. The liquefier tube according to claim 2, wherein the ribs of said plurality of ribs are spaced evenly along a circumference of said inner surface of said transitional portion, and wherein the ribs of said plurality of ribs have a differentiable cross-sectional profile.

14. The liquefier tube according to claim 13, wherein the ribs of said plurality of ribs have a differentiable profile as a function of a longitudinal position within the transitional portion of the feed channel, and wherein said transitional portion is provided with at least one distribution element that is supported at a supporting location.

15. The liquefier tube according to claim 14, wherein said at least one distribution element has a diameter that is larger than a maximum radial distance between ribs of said plurality of ribs at said supporting location; and wherein said at least one distribution element comprises a heat conductive material.

16. The liquefier tube according to claim 15, further comprising a thermal barrier within said body between said feeding portion and said transitional portion, and wherein at least one of said feeding portion and said outlet portion has a circular cross section.

17. A method of manufacturing a liquefier tube according to claim 13, comprising:
a. providing a mandrel having an outer surface that is provided with an uter profile that is complementary to an inner profile of said feed channel of said liquefier tube and wherein said outer surface is electrically conductive;
b. depositing a metal layer on said electrically conducting outer surface for forming said liquefier tube using electroforming;
c. removing said liquefier tube from the mandrel.

18. A method of manufacturing a liquefier tube according to claim 16, comprising:
a. providing a mandrel having an outer surface that is provided with an outer profile that is complementary to an inner profile of said feed channel of said liquefier tube and wherein said outer surface is electrically conductive;
b. depositing a metal layer on said electrically conducting outer surface for forming said liquefier tube using electroforming;
c. removing said liquefier tube from the mandrel.

19. A method of manufacturing a liquefier tube according to claim 13, comprising:
a. providing a machining tool having an outer surface profile complementary to an inner surface profile of said feed channel of said liquefier tube, and wherein said outer surface is electrically conductive;
b. providing a metal body for accommodating said feed channel of said liquefier tube;
c. performing at least one of electrochemically machining (ECM) and electrically discharge machining (EDM) on said metal body to form said feed channel within said metal body using said machining tool.

20. A method of manufacturing a liquefier tube according to claim 16, comprising:
a. providing a machining tool having an outer surface profile complementary to an inner surface profile of said feed channel of said liquefier tube, and wherein said outer surface is electrically conductive;
b. providing a metal body for accommodating said feed channel of said liquefier tube;
c. performing at least ne of electrochemically machining (ECM) and electrically discharge machining (EDM) on said metal body to form said feed channel within said metal body using said machining tool.

21. The liquefier tube according to claim 1, wherein the liquefier tube is a single piece.

* * * * *

UNITED STATES PATENT AND TRADEMARK OFFICE
CERTIFICATE OF CORRECTION

| | |
|---|---|
| PATENT NO. | : 11,964,427 B2 |
| APPLICATION NO. | : 17/281439 |
| DATED | : April 23, 2024 |
| INVENTOR(S) | : Marald Speelman |

It is certified that error appears in the above-identified patent and that said Letters Patent is hereby corrected as shown below:

In the Claims

In Claim 20, Column 10, Line 39, delete "ne" and insert -- one --.

Signed and Sealed this
Fifth Day of November, 2024

Katherine Kelly Vidal
*Director of the United States Patent and Trademark Office*